(12) United States Patent
Wang et al.

(10) Patent No.: US 9,756,680 B2
(45) Date of Patent: Sep. 5, 2017

(54) METHOD AND APPARATUS FOR GENERATING PDU AND BASE STATION THEREOF

(75) Inventors: Yonggang Wang, Shanghai (CN); Zhongji Hu, Shanghai (CN); He Wang, Shanghai (CN)

(73) Assignee: Alcatel Lucent, Bouogne-Billancourt (FR)

( * ) Notice: Subject to any disclaimer, the term of this patent is extended or adjusted under 35 U.S.C. 154(b) by 1004 days.

(21) Appl. No.: 12/531,784

(22) PCT Filed: Mar. 21, 2008

(86) PCT No.: PCT/CN2008/000565
§ 371 (c)(1),
(2), (4) Date: Sep. 17, 2009

(87) PCT Pub. No.: WO2008/113265
PCT Pub. Date: Sep. 25, 2008

(65) Prior Publication Data
US 2010/0111110 A1  May 6, 2010

(30) Foreign Application Priority Data
Mar. 21, 2007  (CN) .......................... 2007 1 0038488

(51) Int. Cl.
*H04J 3/00* (2006.01)
*H04W 80/02* (2009.01)
(Continued)

(52) U.S. Cl.
CPC ........... *H04W 80/02* (2013.01); *H04L 1/0071* (2013.01); *H04L 1/0083* (2013.01); *H04W 28/065* (2013.01)

(58) Field of Classification Search
CPC .. H04W 28/065; H04W 28/06; H04L 1/0083; H04L 1/0079; H04L 65/607; H04H 60/07
(Continued)

(56) References Cited

U.S. PATENT DOCUMENTS 8,102,880 B2 * 1/2012 Charpentier et al. ......... 370/474
2002/0048281 A1   4/2002 Yi et al.
(Continued)

FOREIGN PATENT DOCUMENTS

CN         1339903         3/2002
CN         1913530         2/2007

OTHER PUBLICATIONS

Alcatel-Lucent: "RLC PDU Structure in LTE," 3rd Generation Partnership Project (3GPP); 3GPP TSG RAN WG2 Meeting #56bis, Sorrento, Italy, R2-070 106, XP050133220, pp. 1-4, Jan. 15-19, 2007.

(Continued)

*Primary Examiner* — Yemane Mesfin
*Assistant Examiner* — Mon Cheri Davenport
(74) *Attorney, Agent, or Firm* — Fay Sharpe, LLP

(57) ABSTRACT

Disclosed is a method and apparatus for generating a PDU and a base station thereof. The method for generating a PDU includes: segmenting an input SDU into at least one segmentation in such a manner that the at least one segmentation is distributed in at least one PDU; and setting an offset field and at least one length indicator field in a header of each PDU, wherein the offset field indicates an offset of a first segmentation of a first new SDU appearing in the PDU, and the length indicator field indicates the end of the new SDU or the segmentation of the new to SDU in the PDU. With the present invention, since a single SDU is indicated only using one LI even if it is segmented into a plurality of segmentations, and the LI indicates the end of SDU in one PDU, it (Continued)

is ensured that an eNB in the SFN can recover packets in case of multiple packets loss while avoiding de-synchronization during the contents transmission.

30 Claims, 4 Drawing Sheets

(51) Int. Cl.
*H04L 1/00* (2006.01)
*H04W 28/06* (2009.01)

(58) Field of Classification Search
USPC ....... 370/229, 230, 235, 252, 389, 392, 394, 370/474, 476
See application file for complete search history.

(56) References Cited

U.S. PATENT DOCUMENTS

| | | | |
|---|---|---|---|
| 2006/0072458 A1* | 4/2006 | Dougall et al. | 370/230 |
| 2007/0060139 A1* | 3/2007 | Kim et al. | 455/445 |
| 2008/0186946 A1* | 8/2008 | Marinier et al. | 370/349 |
| 2013/0230038 A1* | 9/2013 | Walton et al. | 370/338 |

OTHER PUBLICATIONS

"3rd Generation Partnership Project; Technical Specification Group Radio Access Network; Radio Link Control (RLC) Protocol Specification (Release 7)," 3GPP TS 25.322 V7.2.0, XP050367794, pp. 1-80, Sep. 1, 2009.

Alcatel-Lucent: "Multiple Packets Loss Recovery and RLC PDU Format in eMBMS," 3rd Generation Partnership Project (3GPP), 3GPP TSG RAN WG RAN2 #58bis, Orlando, US, R2-072360, XP050135207, 4 pages, Jan. 25-29, 2007.

Supplementary European Search Report for EP 08715017.3 dated Jun. 28, 2011.

"Final Test of DIS 8473. Protocol for Providing the Connectionless-mode Network Service", International Organization for Standardization, ANSI X3S3.3 86-80, ISO TC97/SC6/N 3998, Mar. 1986, p. 5-8.

"Universal Mobile Telecommunications System (UMTS); Radio Link Control (RLC) protocol specification", (3GPP TS 25.322 v. 7.2.0 Release 7), ETSI TS 125 322 V7.2.0, (Sep. 2006).

* cited by examiner

METHOD AND APPARATUS FOR GENERATING PDU AND BASE STATION THEREOF

BACKGROUND OF THE INVENTION

1. Field of Invention

The present invention generally relates to a field of mobile communication, and in particular to a method and apparatus for generating a PDU and a base station thereof, which may be applied in the Single Frequency Network (SFN) to recover multiple packets lost during the transmission of service data so as to ensure contents synchronization between different base stations.

2. Description of Prior Art

In a wireless network transmission system adopting a SFN technology, for example, in a Multimedia Broadcast and Multicast (MBMS) system of LTE, all base stations (hereinafter referred to as eNB) totally keep synchronous in both time and frequency. In this way, if each eNB transmits the same data at one starting point and adopts the same physical layer modulation and coding technologies, in the space transmission, each signal sent from respective eNBs has the same waveform. At a user equipment (hereinafter referred to as UE) side, data sent from the eNBs may be considered as a signal sent from one eNB. Since signals received by the UEs are all useful signals carrying the same data, such a technology may significantly reduce interferences coming from neighboring cells (because signals coming from the neighboring cells here are all useful signals, rather than interferences), thus may be applied in some broadcast and multicast systems. For example, such a SFN technology may be applied in the MBMS system of LTE.

FIG. 1 shows a network topology for the LTE MBMS. Network elements supporting MBMS mainly include Broadcast/Multicast Service Center (BM-SC), SAE Gate-Way (SAE GW), eNB and UE. In general, an interface between a UE and an eNB is called as S1 interface.

As an entry for contents provider, BM-SC is adapted to perform an authorization, initiate a MBMS bearer service in the PLMN, and transmit MBMS data in accordance with a preset schedule. SAE GW controls the MBMS bearer service for the user, and transmits the MBMS data to E-UTRAN. The eNB is responsible for transmitting the MBMS data to an air interface of a designated MBMS service area with high efficiency.

FIG. 2 shows a schematic diagram of a network structure for the SFN. In FIG. 2, each base station is covered with the same frequency point, and it is unnecessary to perform time multiplexing, frequency multiplexing, or code multiplexing between cells. One service is assigned with the same time and frequency resources in any area covered by the base stations. Since the same physical layer modulation and coding technologies are applied, each signal carrying the same data sent from respective base stations has the same waveform. In view of the receiver of the UE, the signal looks like to be sent from one base station, just with some multi-paths having large time delay. The SFN may be fully covered with normal transmission powers of all base stations or improved transmission powers of a part of base stations.

In the LTE wireless communication system, the wireless interface protocol layer is divided into three layers. The bottom layer is Physical Layer (L1), above which a Data Link Layer (L2) and Network Layer are involved. At the wireless interface, the Data Link Layer is divided into several sub-layers, including a Media Access Control (MAC) protocol sub-layer, a Radio Link Control (RLC) protocol sub-layer, and a Packet Data Convergence Protocol (PDCP) sub-layer. The Network Layer (L3) provides Radio Resource Control (RRC) function.

In the whole protocol, IP data packets arrive at respective eNBs, and each IP data packet has a variable length, for example, ranging from tens of byes to 1500 bytes. Furthermore, since there are different paths to respective eNBs, multiple packets loss will occur during the transmission. Therefore, it is critical to ensure the contents synchronization for the data sent from respective eNBs for one eMBMS service. In view of this, it is needed to achieve a simple recovery for the eNB wireless processing when there are packets lost during the data distribution to the eNBs.

Here, packet loss recovery means filling pseudo data into a wireless link control buffer without recovering real data in the packet, since the contents synchronization for the transmissions of respective packets can be ensured after the packet loss as long as the eNB knows the length of the packet to be transmitted.

FIG. 3 shows a relationship between RLC SDU (Service Data Unit) and RLC PDU (Protocol Data Unit) in the existing unicast situation, in which each segmentation has a length indicator. As shown in FIG. 3, it is assumed that, at the eNB side, the RLC PDU has a size of 600 bytes, two bytes for SN and SI are included in the RLC PDU header, and each LI has a size of 2 bytes.

It can be seen from FIG. 3 that two packets are lost at the S1 interface (SN=i, i+1). When the eNB receives a packet numbered as SN=i+3, it is known that the previous two packets have been lost. However, the eNB only knows that there are two packets lost and the total length of the packet is of 600 bytes, it does not know the length distribution of the 600 bytes in the lost two packets.

FIG. 4 shows a distribution of byte length for the two lost packets. As shown in FIG. 4, one of the lost two packets is of 400 bytes, the other one is of 200 bytes, and they are divided, in together, into three segmentations, each of which is indicated using respective LIs in different PDUs. For example, in the previous PDU, two LIs respectively indicate 296 bytes from the SDU numbered as SN=i and 298 bytes from the SDU numbered as SN=i+1. In the posterior PDU, the three LIs respectively indicate 102 bytes from the SDU numbered as SN=i+1, 200 bytes from the SDU numbered as SN=i+2, and 290 bytes from the SDU numbered as SN=i+3. If recovery is performed following such a manner, the starting byte of the next PDU will be 1286.

FIG. 5 shows another distribution of byte length for the two lost packets. As shown in FIG. 5, one of the lost two packets is of 298 bytes, the other one is of 302 bytes, and they respectively serve as one segmentation, thereby forming two segmentations in total, each of which is indicated using respective LIs in different PDUs. For example, in the previous PDU, two LIs respectively indicate 296 bytes from the SDU numbered as SN=i and 298 bytes from the SDU numbered as SN=i+1. In the posterior PDU, the two LIs respectively indicate 302 bytes from the SDU numbered as SN=i+2 and 292 bytes from the SDU numbered as SN=i+3. If recovery is performed following such a manner, the starting byte for the next PDU will be 1288.

It can be seen from the above examples that the de-synchronization for the RLC PDU contents will be incurred since the number of segmentations for the recovered RLC SDU numbered as SN=i+1 is different from the number of segmentations for the recovered RLC SDU numbered as SN=i+2, and each segmentation has respective LI, for example there are two LIs or three LIs.

Consequently, since segmentations of a single SDU have respective LIs, the eNB can not know the distribution of byte length for respective packets in case of multiple packets loss, and the lost packets can not be correctly recovered, thus leading to the contents de-synchronization at the eNB. Moreover, the contents de-synchronization would affect contents synchronization of subsequent packets. In a word, using the unicast RLC PDU format can not recover lost packets at the eNB but easily leading to the contents de-synchronization.

SUMMARY OF THE INVENTION

In view of the above problems, the object of the present invention is to provide a method and apparatus for generating a PDU and a base station thereof, with which multiple packets lost during the service data transmission can be recovered so as to keep contents transmission synchronization between different base stations. The method, apparatus and base station proposed by embodiments of the present invention are also applied in the unicast transmission.

According to an aspect of the present invention, a method for generating a PDU is provided, comprising steps of: segmenting an input SDU into at least one segmentation in such a manner that the at least one segmentation is distributed in at least one PDU; and setting an offset field and at least one length indicator field in a header of each PDU, wherein the offset field indicates an offset of a first segmentation of a first new SDU appearing in the PDU, and the length indicator field indicates a total length of the new SDU.

According to another aspect of the present invention, a method for generating a PDU is provided, comprising steps of: segmenting an input SDU into at least one segmentation in such a manner that the at least one segmentation is distributed in at least one PDU; and setting at least one length indicator field in a header of each PDU, wherein the length indicator field indicates a length of the last segmentation of the at least one segmentation.

According to yet another aspect of the present invention, an apparatus for generating a PDU is provided, comprising: a segmentation unit adapted to segment an input SDU into at least one segmentation in such a manner that the at least one segmentation is distributed in at least one PDU; a calculation unit adapted to calculate an offset of a first segmentation of a first new SDU appearing in the PDU; and a setting unit adapted to set an offset field and at least one length indicator field in a header of each PDU, wherein the offset field indicates an offset of a first segmentation of a new SDU appearing in the PDU, and the length indicator field indicates a total length of the new SDU.

According to yet another aspect of the present invention, an apparatus for generating a PDU is provided, comprising: a segmentation unit adapted to segment an input SDU into at least one segmentation in such a manner that the at least one segmentation is distributed in at least one PDU; a calculation unit adapted to calculate a length of the last segmentation of the at least one segmentation; and a setting unit adapted to set at least one length indicator field in a header of each PDU, wherein the length indicator field indicates a length of the last segmentation of the at least one segmentation.

With the above methods and apparatus proposed by embodiments of the present invention, since a single SDU is indicated only using one LI even if it is segmented into a plurality of segmentations, and the LI indicates the end of SDU in one PDU, it is ensured that an eNB in the SFN can recover packets in case of multiple packets loss while avoiding the de-synchronization during the contents transmission.

BRIEF DESCRIPTION OF THE DRAWINGS

The above objects, advantages and features of the present invention will be apparent from the following detailed description on the preferred embodiments taken conjunction with the drawings in which.

DETAILED DESCRIPTION OF THE PREFERRED EMBODIMENTS

Hereinafter, a detailed description will be given to the embodiments of the present invention with reference to the figures. In the description, the elements or functions unnecessary to the description of the present invention will be omitted in order not to obscure the present invention.

Figure 6A:
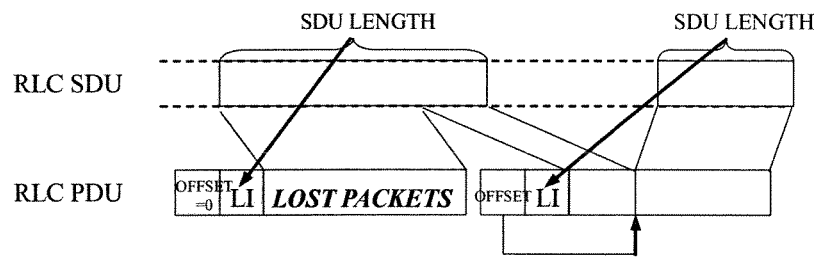
FIG. 6A shows one example of data format constructing PDU according to a first embodiment of the present invention.

FIG. 6A shows an example of data format constructing a PDU according to the first embodiment of the present invention. As shown in FIG. 6A, one OFFSET field and at least one LI field are set in a header of each PDU. The OFFSET field indicates an offset of a first segmentation of a first new SDU appearing in the PDU. Each RLC PUD only has one OFFSET field. If a first segmentation of one SDU starts just after one LI field, a value of the OFFSET field will be set to 0. Moreover, the LI field indicates a total length of a new SDU. If there are a plurality of new SDUs in the PDU, there are a plurality of LI fields. Here, the LI field has a length of two bytes, and the OFFSET field has a length of two bytes.

The reason for setting the OFFSET field lies in that if a UE at a receiver side finds one PDU has been lost, it may find a starting point of a next new SDU based on the OFFSET field, otherwise, the receiver can not find a starting point of a complete SDU if there is no OFFSET field.

Figure 6B:
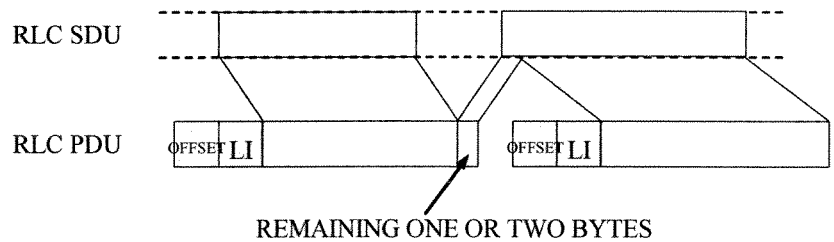
FIG. 6B shows another example of data format constructing PDU according to the first embodiment of the present invention.

In addition, if there are two or one bytes unfilled in the RLC PDU, it is needed to fill data of corresponding number of bytes of next RLC SDU into the previous RLC PDU, instead of filling LI into the previous RLC PDU. In this way, one SDU has only one LI. FIG. 6B shows such an example.

Figure 7:
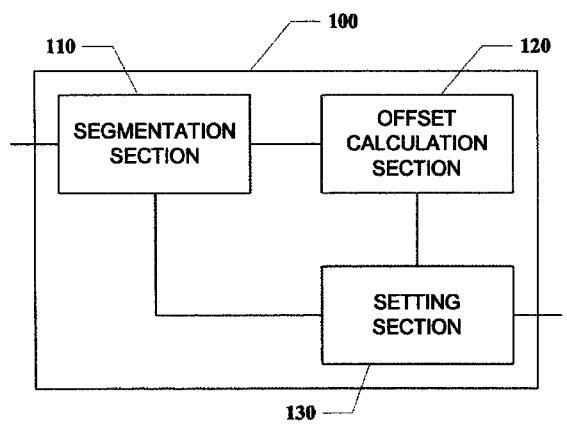
FIG. 7 shows a functional block diagram of an apparatus for generating a PDU according to the first embodiment of the present invention.

FIG. 7 shows a functional block diagram of an apparatus for generating a PDU according to the first embodiment of the present invention. As shown in FIG. 7, the apparatus 100 comprises a segmentation unit 110, an offset calculation unit 120 and a setting unit 130.

The segmentation unit 110 receives a RLC SDU input externally and segments the received RLC SDU in accordance with a preset length for RLC PDU, so as to construct different PDUs. The calculation unit 120 calculates an offset position for respective new SDU segmentations to be filled in the PDU, for example a position number in the data transmission stream. The setting unit 130 writes the position number calculated by the offset calculation unit 120 into an OFFSET field and then writes a length of a corresponding SDU into a LI field.

In addition, if there are two or one bytes unfilled in the current RLC PDU, data of corresponding number of bytes (i.e. the number of unfilled bytes) of next RLC SDU will be filled into the current RLC PDU, rather than filling LI field of the next RLC PDU into the end of the current RLC PDU field.

Figure 8A:
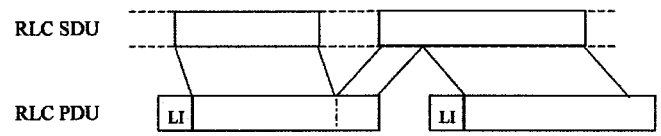
FIG. 8A shows one example of data format constructing PDU according to a second embodiment of the present invention.

FIG. 8A shows an example of data format constructing PDU according to the second embodiment of the present invention. As shown in FIG. 8A, there is a LI field included in a header of the data format according to the second embodiment of the present invention, but no OFFSET field. However, the LI field here has a value indicating the end of SDU in one PDU, i.e. a length of the last segmentation of one SDU.

Figure 8B:
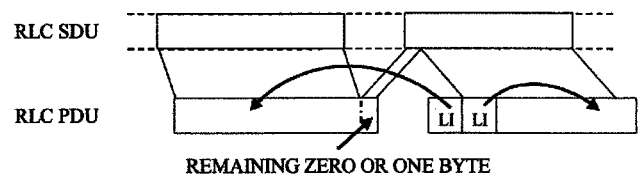
FIG. 8B shows another example of data format constructing PDU according to the second embodiment of the present invention.

If the length of the last SDU segmentation is less than the vacancy in the RLC PDU by one byte, the previous byte of next RLC SDU is also filled into the end of the RLC PDU, as shown in FIG. 8B. In this case, it is needed to fill the LI of the SDU segmentation into the posterior RLC PDU. Otherwise, i.e. if the length of the last SDU segmentation is equal to the vacancy in the RLC PDU, it is also needed to fill the LI of the SDU segmentation into the posterior RLC PDU. Also, the LI field is filled with a reserved value.

The following table shows reserved values for specific LIs in some special cases and corresponding explanations.

| Bits | Descriptions |
|---|---|
| 0000,0000,0000,000 | The previous RLC PDU is exactly filled with the last segmentation of an RLC SDU, and there is no LI that indicates the end of the RLC SDU in the previous RLC PDU. |
| 0100,0000,0000,000 | The last segmentation of an RLC SDU is one more byte more of exactly filling the previous RLC PDU, and there is no LI that indicates the end of the RLC SDU in the previous RLC PDU. The remaining one byte in the previous RLC PDU is the first byte of next RLC PDU. |
| 1000,0000,0000,000 | The last segmentation of an RLC SDU is one more byte more of exactly filling the previous RLC PDU, and there is no LI that indicates the end of the RLC SDU in the previous RLC PDU. The remaining one byte in the previous RLC PDU is ignored. |
| 1100,0000,0000,000 | The remaining byte in the current RLC PDU is a padding byte. |

Figure 9:
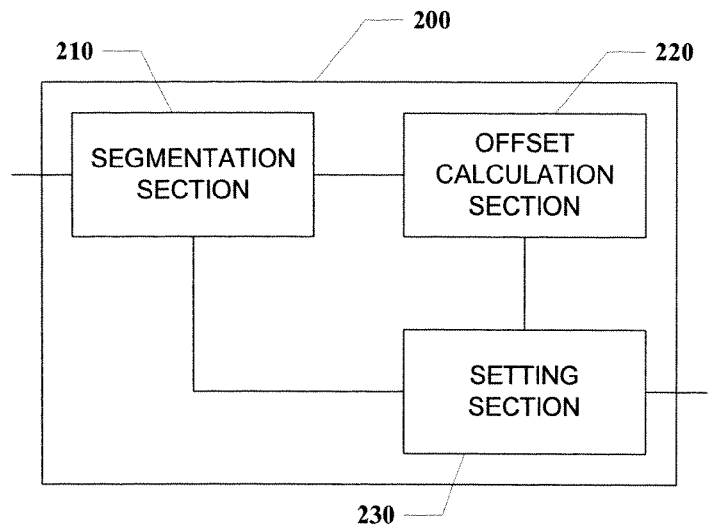
FIG. 9 shows a functional block diagram of an apparatus for generating a PDU according to the second embodiment of the present invention.

FIG. 9 shows a functional block diagram of an apparatus for generating a PDU according to the second embodiment of the present invention. As shown in FIG. 9, an apparatus 200 comprises a segmentation unit 210, a calculation unit 220 and a setting unit 230.

The segmentation unit 200 receives a RLC SDU input externally and segments the received RLC SDU based on a preset length for RLC PDU, so as to construct different PDUs. The calculation unit 220 calculates a length of the last segmentation of the respective segmentations segmented in the current SDU. The setting unit 230 writes the length calculated by the calculation section 220 into a LI field.

Figure 1:
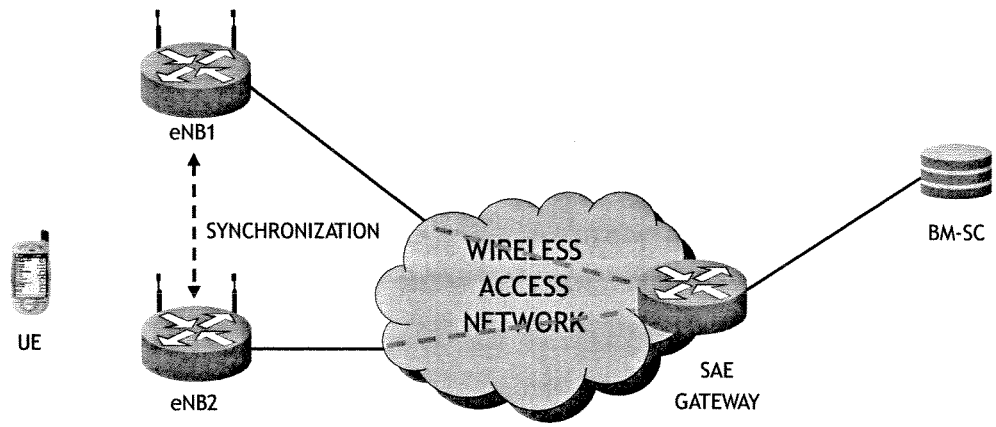
FIG. 1 shows a network topology for LTE MBMS.
Figure 2:
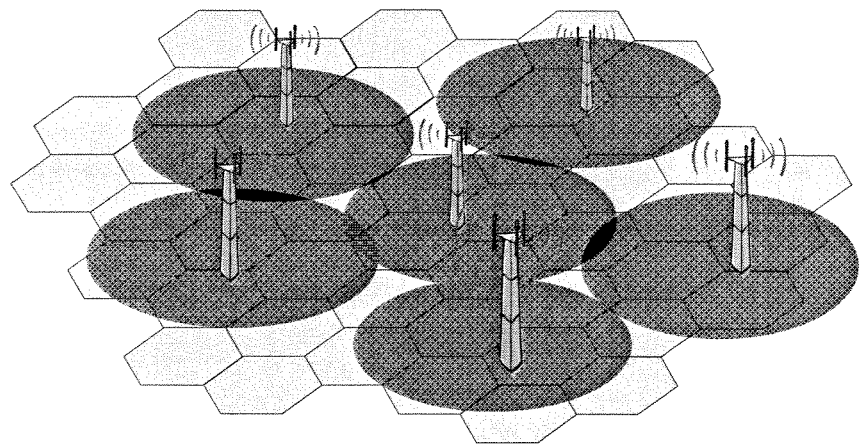
FIG. 2 shows a schematic diagram of a network structure for the SFN.
Figure 3:
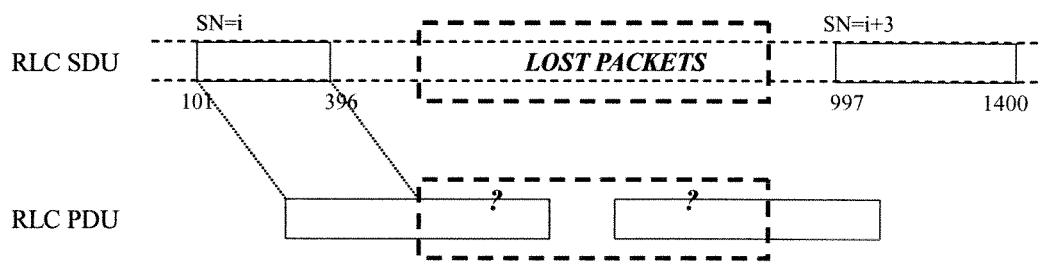
FIG. 3 shows a relationship between RLC SDU and RLC PDU in the existing unicast situation.
Figure 4:
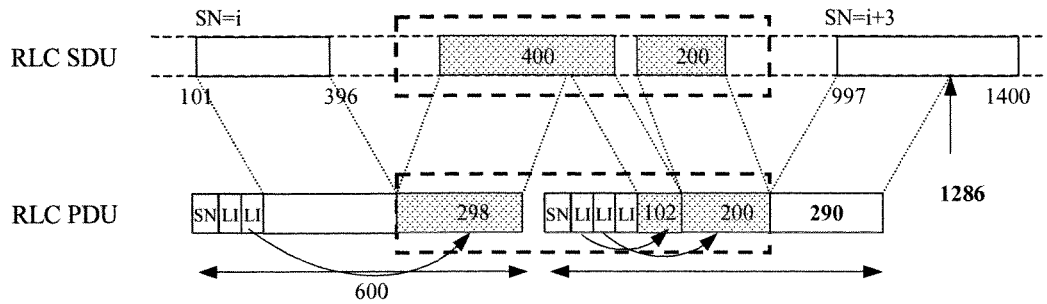
FIG. 4 shows one distribution of byte length for two lost packets.
Figure 5:
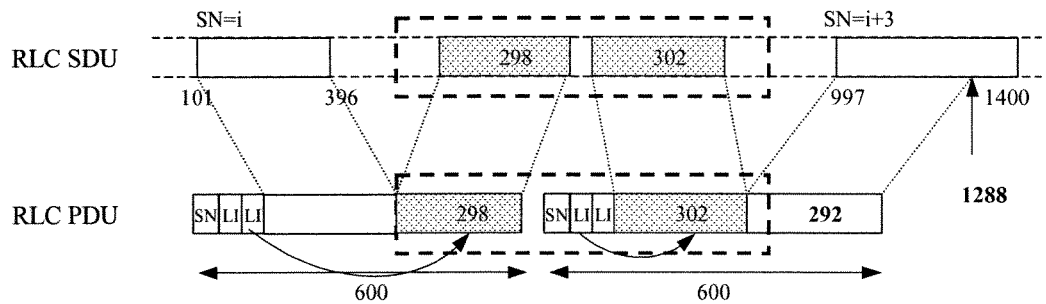
FIG. 5 shows another distribution of byte length for two lost packets.
Figure 10A:
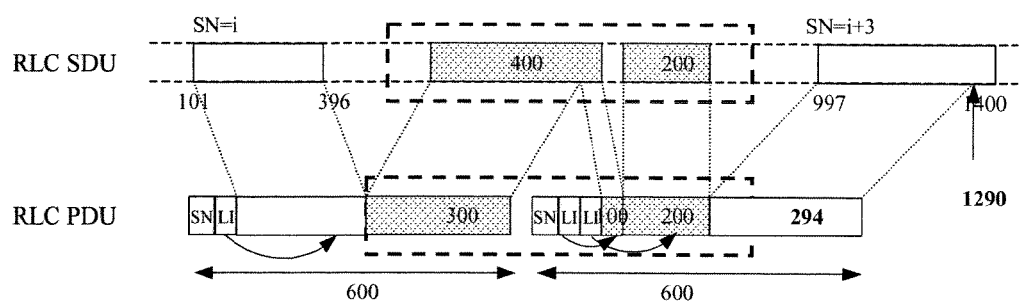
FIG. 10A is a schematic diagram of recovery for one distribution of byte length for two lost packets according to the second embodiment of the present invention.
Figure 10B:
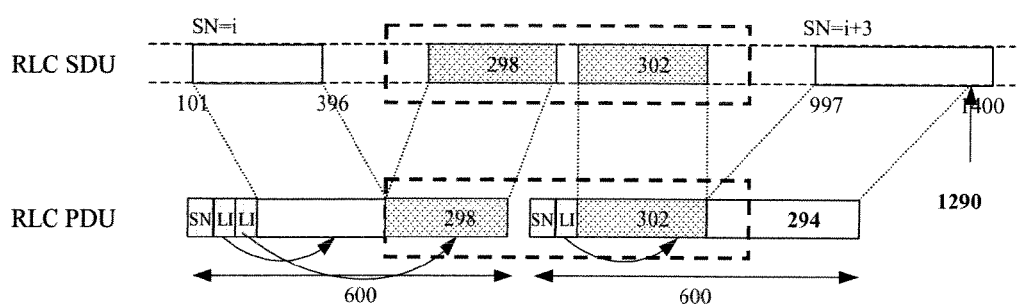
FIG. 10B is a schematic diagram of recovery for another distribution of byte length for two lost packets according to the second embodiment of the present invention.

FIGS. 10A and 10B respectively show schematic diagram of recovery for different distributions of byte lengths for two lost packets according to the second embodiment of the present invention. As shown in FIG. 3, two packets (SN=1, i+1) are lost at the S1 interface. When the eNB receives the packet numbered as SN=i+3, it is known that the previous two packets have been lost. However, the eNB only knows that there are two packets lost and the total length of the two packets is of 600 bytes, but not the length distribution of the lost two packets in the lost 600 bytes.

FIG. 10A shows one distribution of byte length for two lost packets. As shown in FIG. 10A, one of the lost two packets is of 400 bytes, the other one is of 200 bytes, and they are divided, in together, into three segmentations. However, only the segments in the posterior PDU are indicated with LIs. For example, in the previous PDU, one LI indicates 296 bytes from the SDU numbered as SN=I, and there is no LI for 300 bytes from the SDU numbered as SN=i+1 based on the idea of the second embodiment of the present invention, in which only the first segmentation is indicated with LI. In the posterior PDU, the two LIs respectively indicate 100 bytes from the SDU numbered as SN=i+1 and 200 bytes from the SDU numbered as SN=i+2, and there is no LI for 294 bytes from the SDU numbered as SN=i+3 based on the idea of the second embodiment of the present invention. In this way, the total number of bytes for RLC headers, which are filled in these two RLC PDUs, including SN and LI, is 4 bytes SN+6 bytes LI=10 bytes If recovery is performed following such a manner, the starting byte of the next PDU will be (1200−10−296−600)bytes+997−1=1290.

FIG. 10B shows another distribution of byte length for two lost packets. As shown in FIG. 10B, one of the lost two packets is of 298 bytes, the other one is of 302 bytes, and they respectively serves as one segmentation, thereby forming two segmentations in total, each of which is indicated using respective LIs in different PDUs. For example, in the previous PDU, the two LIs respectively indicate 296 bytes from the SDU numbered as SN=i and 298 bytes from the SDU numbered as SN=i+1. In the posterior PDU, the LI indicates 302 bytes from the SDU numbered as SN=i+2, and there is no LI for 294 bytes from the SDU numbered as SN=i+3 based on the idea of the second embodiment of the present invention. In this way, the total number of bytes for RLC headers, which are filled in these two RLC PDUs, including SN and LI, is 4 bytes $SN$+6 bytes $LI$=10 bytes.

If recovery is performed following the manner mentioned above, the starting byte of the next PDU will be (1200−10−296−600)bytes+997−1=1290.

It can be seen from the above examples that no matter how the segmentations segmented in the RLC SDU numbered as SN=i+1 and the RLC SDU numbered as SN=i+2 are distributed, the RLC PDU contents synchronization will be kept on after recovering LI of 4 bytes and data of 600 bytes since an idea of "one LI per SDU" is followed here, i.e. there are only two LIs.

Other than the MBMS, the present invention may be also applied in the unicast transmission of LTE. In this case, RLC PDU format for the unicast is the same with the formats for the PDUs generated by the methods and apparatuses according to the first embodiment and the second embodiment, except that there is no need to consider the packet recovering in the unicast transmission.

With the present invention, LI is set for one segment of respective SDUs when constructing RLC PDU in such a manner that each SDU only has one LI even if the SDU is segmented into a plurality of SDU segmentations. If a length indicator LI is placed before the first segmentation of the SDU, an offset field and at least one LI field are set in a header of each PDU, the offset field indicating an offset of a first segmentation of a first new SDU appearing in the PDU, and the LI field indicating a total length of the new SDU. If a length indicator LI is placed before the last segmentation of the SDU, at least one LI field is set in a header of each PDU, the is LI field indicating a length of the last SDU segmentation.

Although some embodiments of the present invention have been shown and described, it will be appreciated by those skilled in the art that many improvements and changes can be made without departing from the principles and spirits of the invention which is solely defined by the following claims.

What is claimed is:

1. A method for generating a Protocol Data Unit (PDU), the method comprising:
   via a segmentation unit, segmenting an input Service Data Unit (SDU) into at least one segmentation in such a manner that the at least one segmentation is distributed in at least one PDU; and
   via a setting unit, setting an offset field and at least one length indicator field in a header of the at least one PDU, wherein the offset field indicates an offset of a first segmentation of a first new SDU appearing in the PDU, and the length indicator field indicates a total length of the new SDU, and wherein there is one length indicator per SDU.

2. The method according to claim 1, wherein if a first segmentation of one SDU, which is filled in the PDU, starts just after one length indicator field, a value of an offset field for the PDU is set to 0.

3. The method according to claim 1, wherein if there are two or one bytes unfilled in the PDU, bytes of the number of unfilled bytes of next SDU are filled into the previous PDU.

4. The method according to claim 2, wherein the length indicator field has a length of two bytes.

5. The method according to claim 2, wherein the offset field has a length of two bytes.

6. A method for generating a Protocol Data Unit (PDU), the method comprising:
   via a segmentation unit, segmenting an input Service Data Unit (SDU) into at least one segmentation in such a manner that the at least one segmentation is distributed in at least one PDU; and
   via a setting unit, setting at least one length indicator field in a header of the at least one PDU, wherein the length indicator field indicates a length of the last segmentation of the at least one segmentation, and wherein there is one length indicator per SDU.

7. The method according to claim 6, wherein if the length of the last segmentation of the SDU is less than vacancy in the PDU by one byte, the previous byte of next SDU is filled into the end of the PDU.

8. The method according to claim 6, wherein if the length of the last SDU segmentation is equal to vacancy in the previous PDU, the length indicator field of the segmentation is filled into the posterior PDU.

9. The method according to claim 7, wherein the length indicator field has a length of two bytes.

10. The method according to claim 7, wherein the length indicator field has a length of eleven bytes.

11. The method according to claim 7, wherein a value of the length indicator field is defined as a first reserved value for indicating that the previous PDU is exactly filled with the last segmentation of the SDU and that there is no length indicator field that indicates the end of the SDU in the previous PDU.

12. The method according to claim 7, wherein a value of the length indicator field is defined as a second reserved value for indicating that the last segmentation of the SDU is one more byte more of exactly filling the previous PDU, that there is no length indicator field that indicates the end of the SDU in the previous PDU, and that the remaining one byte in the previous PDU serves as a first byte of next PDU.

13. The method according to claim 7, wherein a value of the length indicator field is defined as a third reserved value for indicating that the last segmentation of the SDU is one more byte more of exactly filling the previous PDU, that there is no length indicator field that indicates the end of the SDU in the previous PDU, and that the remaining one byte in the previous PDU is ignored.

14. The method according to claim 7, wherein a value of the length indicator field is defined as a fourth reserved value for indicating that the remaining byte in the current PDU is a padding byte.

15. An apparatus for generating a Protocol Data Unit (PDU), the apparatus comprising:
   a segmentation unit configured to segment an input Service Data Unit (SDU) into at least one segmentation in such a manner that the at least one segmentation is distributed in at least one PDU;
   a calculation unit configured to calculate an offset of a first segmentation of a first new SDU appearing in the PDU; and
   a setting unit configured to set an offset field and at least one length indicator field in a header of the at least one PDU, wherein the offset field indicates an offset of a first segmentation of a new SDU appearing in the PDU, and the length indicator field indicates a total length of the new SDU, and wherein there is one length indicator per SDU.

16. The apparatus according to claim 15, wherein if a first segmentation of one SDU, which is filled in the PDU, starts just after one length indicator field, a value of an offset field for the PDU is set to 0.

17. The apparatus according to claim 15, wherein if there are two or one bytes unfilled in the PDU, bytes of the number of unfilled bytes of next SDU are filled into the previous PDU.

18. The apparatus according to claim 16, wherein the length indicator field has a length of two bytes.

19. The apparatus according to claim 16, wherein the offset field has a length of two bytes.

20. The apparatus according to claim 15, implemented in a base station.

21. An apparatus for generating a Protocol Data Unit (PDU), the apparatus comprising:
a segmentation unit configured to segment an input Service Data Unit (SDU) into at least one segmentation in such a manner that the at least one segmentation is distributed in at least one PDU;
a calculation unit configured to calculate a length of the last segmentation of the at least one segmentation; and
a setting unit configured to set at least one length indicator field in a header of the at least one PDU, the length indicator field indicating a length of the last segmentation of the at least one segmentation, and wherein there is one length indicator per SDU.

22. The apparatus according to claim 21, wherein if the length of the last segmentation of the SDU is less than vacancy in the PDU by one byte, the previous byte of next SDU is filled into the end of the PDU.

23. The apparatus according to claim 21, wherein if the length of the last SDU segmentation is equal to vacancy in the previous PDU, the length indicator field of the segmentation is filled into the posterior PDU.

24. The apparatus according to claim 22, wherein the length indicator field has a length of two bytes.

25. The apparatus according to claim 23, wherein the length indicator field has a length of eleven bytes.

26. The apparatus according to claim 23, wherein a value of the length indicator field is defined as a first reserved value for indicating that the previous PDU is exactly filled with the last segmentation of the SDU and that there is no length indicator field that indicates the end of the SDU in the previous PDU.

27. The apparatus according to claim 23, wherein a value of the length indicator field is defined as a second reserved value for indicating that the last segmentation of the SDU is one more byte more of exactly filling the previous PDU, that there is no length indicator field that indicates the end of the SDU in the previous PDU, and that the remaining one byte in the previous PDU serves as a first byte of next PDU.

28. The apparatus according to claim 23, wherein a value of the length indicator field is defined as a third reserved value for indicating that the last segmentation of the SDU is one more byte more of exactly filling the previous PDU, that there is no length indicator field that indicates the end of the SDU in the previous PDU, and that the remaining one byte in the previous PDU is ignored.

29. The apparatus according to claim 23, wherein a value of the length indicator field is defined as a fourth reserved value for indicating that the remaining byte in the current PDU is a padding byte.

30. The apparatus according to claim 21, implemented in a base station.

* * * * *